(12) United States Patent
Liang et al.

(10) Patent No.: US 8,504,338 B2
(45) Date of Patent: Aug. 6, 2013

(54) METHOD FOR MEASURING SHAFTING MECHANICAL FATIGUE OF TURBINE GENERATOR SET

(75) Inventors: Xinyan Liang, Beijing (CN); Shaohua Jiao, Beijing (CN); Yuansheng Li, Beijing (CN); Tao Zhang, Beijing (CN); Quan Liu, Beijing (CN)

(73) Assignee: Beijing Sifang Automation Co., Ltd., Beijing (CH)

( * ) Notice: Subject to any disclaimer, the term of this patent is extended or adjusted under 35 U.S.C. 154(b) by 493 days.

(21) Appl. No.: 12/741,509

(22) PCT Filed: Nov. 28, 2008

(86) PCT No.: PCT/CN2008/001940
§ 371 (c)(1),
(2), (4) Date: Jun. 7, 2010

(87) PCT Pub. No.: WO2009/074011
PCT Pub. Date: Jun. 18, 2009

(65) Prior Publication Data
US 2010/0250150 A1    Sep. 30, 2010

(30) Foreign Application Priority Data
Dec. 4, 2007 (CN) .......................... 2007 1 0178667

(51) Int. Cl.
*G06G 7/48* (2006.01)
(52) U.S. Cl.
USPC ............................................................ 703/7

(58) Field of Classification Search
USPC .......... 703/6, 7; 73/650; 701/1, 54; 702/36; 384/204; 318/432
See application file for complete search history.

(56) References Cited

U.S. PATENT DOCUMENTS

| | | | | | |
|---|---|---|---|---|---|
| 3,934,459 | A | * | 1/1976 | Wolfinger et al. ............... | 73/650 |
| 4,282,756 | A | * | 8/1981 | Molnar et al. ................... | 73/650 |
| 4,294,120 | A | * | 10/1981 | Shima et al. ..................... | 73/650 |
| 4,862,749 | A | * | 9/1989 | Yagi ................................. | 73/650 |
| 5,068,800 | A | * | 11/1991 | Brook et al. ..................... | 702/36 |
| RE35,855 | E | * | 7/1998 | Blaettner et al. ............... | 384/204 |
| 2006/0017414 | A1 | * | 1/2006 | Joe et al. ......................... | 318/432 |
| 2009/0037060 | A1 | * | 2/2009 | Carlhammar et al. ........... | 701/54 |

\* cited by examiner

*Primary Examiner* — Kandasamy Thangavelu
(74) *Attorney, Agent, or Firm* — MKG, LLC

(57) ABSTRACT

A method for measuring a shafting mechanical fatigue of a turbine generator set, which involves determining a lumped mass model of a turbine generator set and its parameters; calculating a model frequency and a mode shape of the turbine generator set; acquiring an angular velocity change at a machine end; calculating a torque at a calculating section of shafting based on the model frequency, a mode shape curve and an equivalent rigidity of the lumped mass model, so as to obtain a torque-time history curve at the calculating section of the shafting; calculating a fatigue damage accumulative value for a dangerous section of a set shafting under a certain malfunction or disturbance, that is, the shafting mechanical fatigue of the turbine generator set.

5 Claims, 3 Drawing Sheets

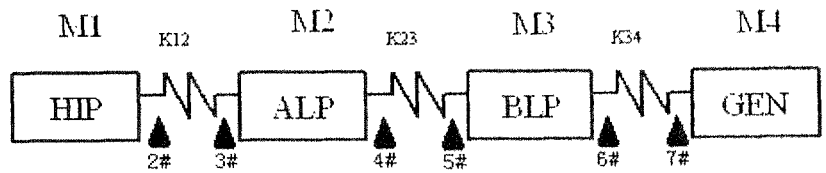
Fig. 1
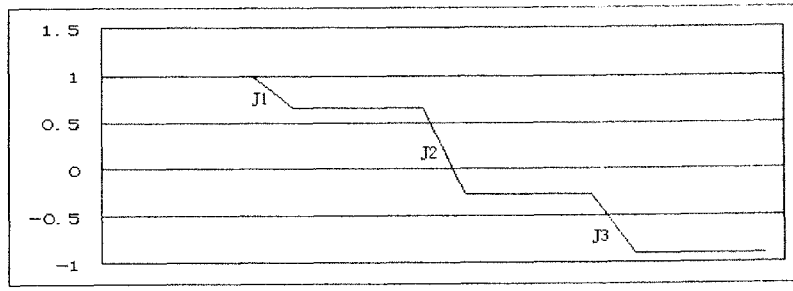
Fig. 2.1 Shafting torsional vibration frequency mode 1 (15.5HZ)
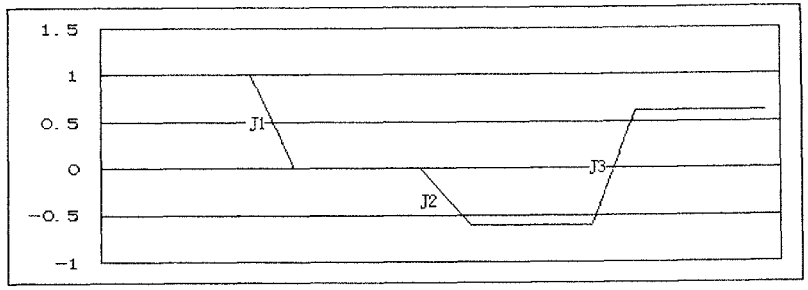
Fig. 2.2 Shafting torsional vibration frequency mode 2 (25.98HZ)
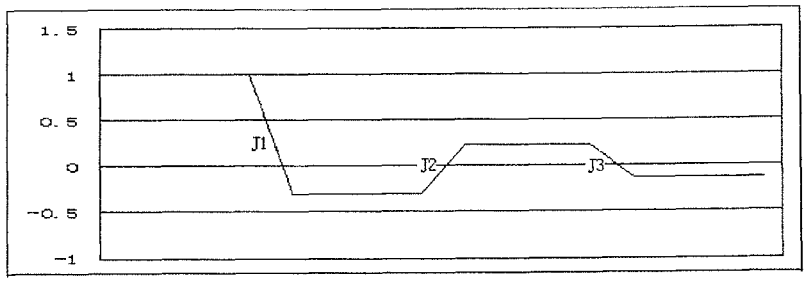
Fig. 2.3 Shafting torsional vibration frequency mode 3 (29.93HZ)
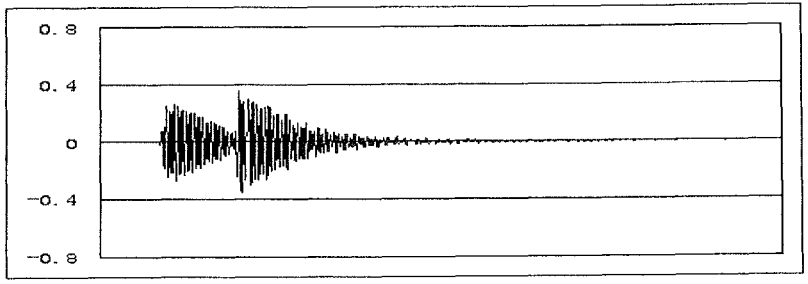
Fig. 3.1

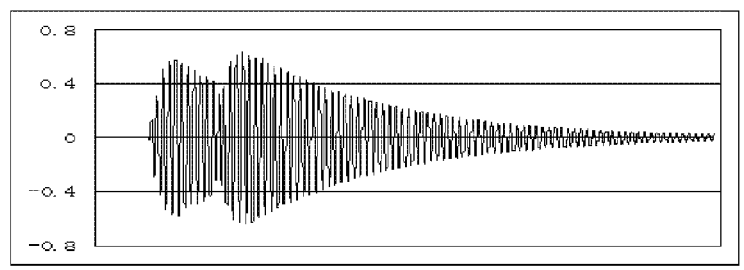
Fig. 3.2
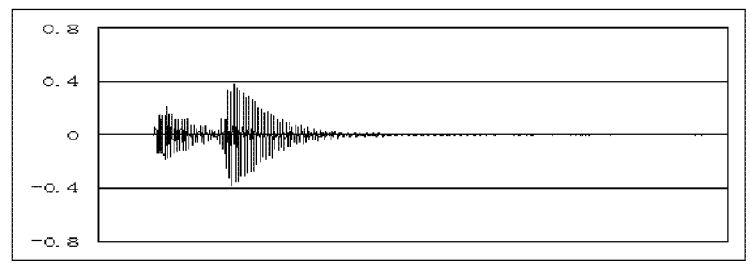
Fig. 3.3
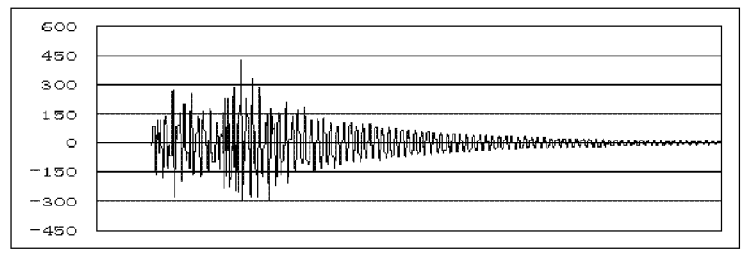
Fig. 4.1
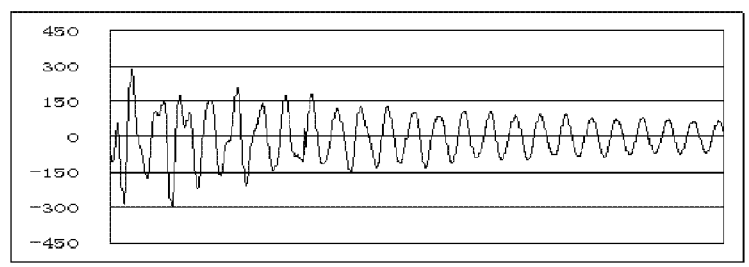
Fig. 4.2
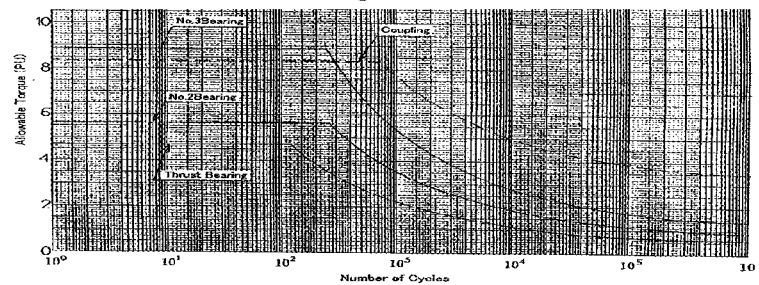
Fig. 5

METHOD FOR MEASURING SHAFTING MECHANICAL FATIGUE OF TURBINE GENERATOR SET

TECHNICAL FIELD

The present invention relates to measurement mechanism of shafting mechanical fatigue which is applied to the industry field with turbine-generator and motor of large capability. e.g., large power plant.

BACKGROUND

Large thermal turbine-generator technique is a crucial part of important equipment in our nation. The shafting of high-power unit takes advantages of lighter, softer, more support, longer span, higher section power density. The higher material utilized coefficient in generator, the higher section power density in shafting. Additionally, the length of shafting is increased, which results in a lower spring constant, a higher fixed shafting spectrum density and a lower energy threshold of oscillation. Furthermore, series capacitor will be widely applied in the future grid to support super high voltage transmission and larger coverage.

Subsynchronous oscillation (SSO) could be caused by series capacitor compensation in the transmission line, HVDC, improper installation of the power system stabilizer (PSS), the feedback action of generator excitation system, silicon controlled system, electro-hydraulic control system and so on. The rotors of the turbine generator have big inertia, and are more sensitive to torsional oscillation modes and thus assume the forced state of low cycle fatigue and high stress. When an electromechanical disturbance occurs, balance between the turbine driving torque and the generator magnetic braking torque is broken, torsional stress acting on the shafting is also changed, the fatigue of the rotor will be increased, and the useful life will be decreased. When the torsional stress is great to a certain level, the shafting will be damaged or even ruptured.

SUMMARY OF THE INVENTION

The object of the present invention is to provide a real-time measuring method of mechanical fatigue in turbine-generator shafting in power plants, which can measure the mechanical fatigue caused by uncertain disturbances in the turbine-generator shafting. The present invention is applicable to large turbo-unit such as 300 MW, 600 MW, 1000 MW, and is also applicable to smaller turbo-units with capacities of 300 MW and below, as well as to large capacity motors. The Cross-section, the dangerous cross-sections and number of rotors depends on the shafting size. Cross-section as used herein denotes interfaces between mass blocks. Dangerous cross-sections stand for the shaft collar of all the rotors of this shafting. For example, as illustrated in FIG. 1, in a typical 600 MW turbine generator, the cross-section J1 is between high and intermediate pressure rotor (HIP) and the low pressure rotor A (ALP), where the torque T1 and the dangerous cross-section is between the #2 and #3 shaft bushing. Similarly, the cross-section J2 is between the low pressure rotor A (ALP) and the low pressure rotor B (BLP), where the torque T2, the dangerous cross-section is between the #4 and #5 shaft bushing. The cross-section J3 is between the low pressure rotor B (BLP) and generator (GEN), where the torque T3 and the dangerous cross-section is between the #6 and #7 shaft bushing.

The real-time measuring method of mechanical fatigue in turbine-generator shafting is detailed in the following steps:

1. Compute torsional mode and vibration curve based on lumped mass model of turbo-unit.

1). Determine the lumped mass model. According to number of rotors, the exemplary typical 600 MW set turbine generator is defined as four lumped mass blocks and three massless springs, which are named as shafting vibration system. See FIG. 1.

2). Determine the parameters of the lumped mass model, i.e., the equivalent inertias of the mass blocks and the spring constants of the springs.

3). Compute the frequency-vibration curve of the shafting. According to the moment of inertia M1, M2, M3, M4, rotational speed ω1, ω2, ω3, ω4, rotational angle δ1, δ2, δ3, δ4 and the spring constant K12, K23, K34 between mass pairs, the free motion per unit equation for each mass block can be acquired:

$$\begin{cases} M1 * \delta1'' + K12(\delta1 - \delta2) = 0 \\ M2 * \delta2'' + K12(\delta2 - \delta1) + K23(\delta2 - \delta3) = 0 \\ M3 * \delta3'' + K23(\delta3 - \delta2) + K34(\delta3 - \delta4) = 0 \\ M4 * \delta4'' + K34(\delta4 - \delta3) = 0 \end{cases}$$

We can rewrite the formula as $$\Delta\delta1'' = -\frac{K12}{M1}(\Delta\delta1 - \Delta\delta2)$$

$$\Delta\delta2'' = \frac{K12}{M2}\Delta\delta1 - \frac{K12}{M2}\Delta\delta2 - \frac{K23}{M2}\Delta\delta2 + \frac{K23}{M2}\Delta\delta3$$

$$\Delta\delta3'' = \frac{K23}{M3}\Delta\delta2 - \frac{K23}{M3}\Delta\delta3 - \frac{K34}{M3}\Delta\delta3 + \frac{K34}{M3}\Delta\delta4$$

$$\Delta\delta4'' = \frac{K34}{M4}(\Delta\delta3 - \Delta\delta4)$$

Which takes matrix form as $$\begin{bmatrix} \Delta\delta1'' \\ \Delta\delta2'' \\ \Delta\delta3'' \\ \Delta\delta4'' \end{bmatrix} = \begin{bmatrix} -\frac{K12}{M1} & \frac{K12}{M1} & 0 & 0 \\ \frac{K12}{M2} & -\frac{K12}{M2} - \frac{K23}{M2} & \frac{K23}{M2} & 0 \\ 0 & \frac{K23}{M3} & -\frac{K23}{M3} - \frac{K34}{M3} & \frac{K34}{M3} \\ 0 & 0 & \frac{K34}{M4} & -\frac{K34}{M4} \end{bmatrix} \begin{bmatrix} \Delta\delta1 \\ \Delta\delta2 \\ \Delta\delta3 \\ \Delta\delta4 \end{bmatrix}.$$

Where [K] and [I] represent the coefficient matrix and Identity matrix, respectively. The dynamic model of the rotors is $$\begin{bmatrix} \Delta\delta' \\ \Delta\omega' \end{bmatrix} = \begin{bmatrix} 0 & I \\ K & 0 \end{bmatrix} \begin{bmatrix} \Delta\delta \\ \Delta\omega \end{bmatrix}$$

Then we can obtain the frequency-vibration curve of the shafting, as shown in FIGS. 2.1 to 2.3.

2. Compute the torques of the cross-section

1) According to the vibration curve of different modes, compute the corresponding various relative torsional angles of mass blocks in different modes. As illustrated in FIGS. 2.1 to 2.3, the various relative torsional angles of four mass blocks in three modes:

$\theta_{11}, \theta_{12}, \theta_{13},$ $\theta_{21}, \theta_{22}, \theta_{23},$ $\theta_{31}, \theta_{32}, \theta_{33};$ 2) Compute the torques excited by unit signal on cross-section of the shafting are (as illustrated in FIGS. 2.1 to 2.3):
The torque between the first and the second mass block in mode 1 is : $t_{1,1} = K_{1,2} \times \theta_{1,1}$
The torque between the second and the third mass block in mode 1 is : $t_{1,2} = K_{2,3} \times \theta_{1,2}$
The torque between the third and the fourth mass block in mode 1 is : $t_{1,3} = K_{3,4} \times \theta_{1,3}$
The torque between the first and the second mass block in mode 2 is : $t_{2,1} = K_{1,2} \times \theta_{2,1}$
The torque between the second and the third mass block in mode 2 is : $t_{2,2} = K_{2,3} \times \theta_{2,2}$
The torque between the third and the fourth mass block in mode 2 is : $t_{2,3} = K_{3,4} \times \theta_{2,3}$
The torque between the first and the second mass block in mode 3 is : $t_{3,1} = K_{1,2} \times \theta_{3,1}$
The torque between the second and the third mass block in mode 3 is : $t_{3,2} = K_{2,3} \times \theta_{3,2}$
The torque between the third and the fourth mass block in mode 3 is : $t_{3,3} = K_{3,4} \times \theta_{3,3}$.

3) By acquisition of the changes of palstance, compute the torques of the cross-section of shafting. Capture the changes of palstance $\Delta\omega$, then obtain different mode signal $\Delta\omega1$, $\Delta\omega2$, $\Delta\omega3$ by filtering.
With $$\Delta\omega_k = A_k\omega_k \cos(\omega_k t), k \in [1,2,3]$$

obtain the terminal rotation angle in different modes are $$\Delta\theta_k = \Delta\omega_k t = A_k \sin(\omega_k t) = \Delta\omega_k * \sin(\omega_k t)/[\omega_k * \cos(\omega_k t)],$$

where, $k \in [1,2,3]$, $\omega_k = 2\pi f_k$, $\Delta\theta_k$ is rotation angle in different modes.

Consequently, the corresponding torque which the input signal act on different cross-section can by computed:
the torque corresponding to cross-section $J_1$ is: $T_1 = T_{1,1} + T_{2,1} + T_{3,1}$
the torque corresponding to cross-section $J_2$ is: $T_2 = T_{1,2} + T_{2,2} + T_{3,2}$
the torque corresponding to cross-section $J_3$ is : $T_3 = T_{1,3} + T_{2,3} + T_{3,3}$,
Where
the torque corresponding to cross-section J1 in mode 1 is $T_{1,1} = t_{1,1} \times \Delta\theta_1$
the torque corresponding to cross-section J1 in mode 2 is $T_{2,1} = t_{2,1} \times \Delta\theta_2$
the torque corresponding to cross-section J1 in mode 3 is $T_{3,1} = t_{3,1} \times \Delta\theta_3$
the torque corresponding to cross-section J2 in mode 1 is $T_{1,2} = t_{1,2} \times \Delta\theta_1$
the torque corresponding to cross-section J2 in mode 2 is $T_{2,2} = t_{2,2} \times \Delta\theta_2$
the torque corresponding to cross-section J2 in mode 3 is $T_{3,2} = t_{3,2} \times \Delta\theta_3$
the torque corresponding to cross-section J3 in mode 1 is $T_{1,3} = t_{1,3} \times \Delta\theta_1$
the torque corresponding to cross-section J3 in mode 2 is $T_{2,3} = t_{2,3} \times \Delta\theta_2$
the torque corresponding to cross-section J3 in mode 3 is $T_{3,3} = t_{3,3} \times \Delta\theta_3$
We can substitute $\Delta\omega$ into the above formulas to obtain the torque T, which further result in the torque-time history plot.

3. Compute the cumulative fatigue values of all the cross-sections of the shafting caused by a perturbation, which is the mechanical fatigue of turbine-generator shafting.
   1) According to the algorithm in step 2, we can obtain torque-time history plot in shafting section of all the cross-sections of the shafting;
   2) Find out the stress cycle in the history plot by utilizing real time rain-flow method;
   3) Compute equivalent stress magnitude corresponding to each stress cycle by utilizing linear averaging method;
   4) Look up the components spring S-N curve (Stress-Fatigue Life curve) in the dangerous cross-sections, to obtain the fatigue damage value caused by a single stress cycle;
   5) The cumulative fatigue value of the specific dangerous cross-section with respect to the vibration is obtained by summing linearly all the fatigue values over all the stress cycle at this dangerous cross-section.

The present invention discloses a real-time measuring method of mechanical fatigue in large turbine-generator shafting, which measures the mechanical fatigue in turbine-generator shafting well and truly. With the application of high-capacity turbine-generator and super high voltage transmission, The Subsynchronous oscillation (SSO) occurs more severely in turbo-unit and power grid. Accurate measurement of shafting mechanical fatigue is crucial to suppress the sub-synchronous oscillation and to protect turbine-generator and other electrical equipment. The invention discloses a real-time measuring method of mechanical fatigue in large turbine-generator shafting for the first time, which is of great significance to solve the problem of subsynchronous oscillation in power plant and power grid.

BRIEF DESCRIPTION OF THE DRAWINGS

FIG. 1 illustrates that a lumped mass model which is determined by a classic turbo-unit (600 MW) according to the number of rotors of its shafting.

FIGS. 2.1 to 2.3 illustrates the vibration mode and inherent frequency of this turbo-unit shafting, wherein FIG. 2.1 denotes the vibration curve at the first order frequency $f_1 = 15.5$ Hz;

FIG. 2.2 denotes the vibration curve at the second order frequency $f_2 = 25.98$ Hz;

FIG. 2.3 denotes the vibration curve at the third order frequency $f_3 = 29.93$ Hz;

FIGS. 3.1 to 3.3 are schematic drawings which show different changes of the palstance in varies modes. FIGS. 3.1, 3.2 and 3.3 corresponds to mode 1, 2 and 3, respectively.

FIGS. 4.1 and 4.2 show torsional power (y axis, unit MW)–time (x, unit s) curve of the specific cross-section on a perturbation, where sampling frequency is 1000 Hz. FIG. 4.1 shows a torsional power–time curve, where the statistic time is 8 seconds, and the sampling frequency is 1000 Hz. Note FIG. 4.2 is to zoom in the first 2 seconds of FIG. 4.1.

FIG. 5 shows the S-N curve of the rotors of the turbo, which reflects material fatigue value.

DETAILED DESCRIPTION OF THE PREFERRED EMBODIMENT

Figure 6:
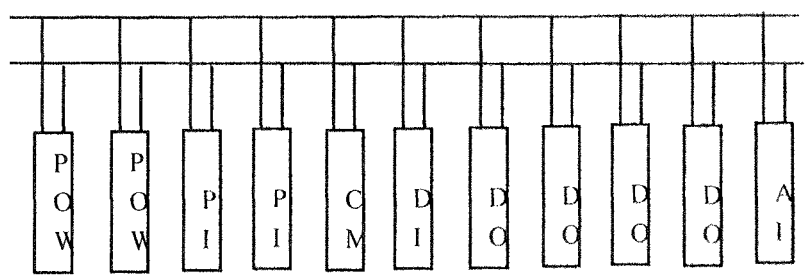
FIG. 6 shows the architecture of the exampled fatigue measurement system.

The invention is further illustrated in conjunction with the appended drawings, referring to the drawings.

The working process of this invention is as follows: Capture the changes of palstance of turbo-unit's engine end, then obtain the instantaneous torsional angle of turbo-unit's engine end. According to the mode frequency, vibration curve, compute torques on each cross-sections of the shafting which is created by input signal, obtain the load-time history plot on the cross-sections of the shafting. Obtain stress cycles with the rain-flow method, looking up S-N curve of corresponding material part to get the fatigue damage, and then calculate the cumulative fatigue damage of each dangerous cross-section with respect to the vibration or fault at each dangerous cross-section, that is, the shafting mechanical fatigue of turbine-generator.

In the S-N curve of the rotors of the turbo, as shown in FIG. 5. The invention gives only the S-N curves of the #2 and #3 shaft bushing which are between HIP and ALP, and the S-N curves of locating bearing and shaft coupling which connect two rotors. The y axis denotes tolerant torque, represented in per-unit value of power. 1 per-unit value denotes 314.6 MW power. The x axis denotes cycle times, represented in logarithmic coordinates. For example, to compute damage in the #2 shaft bushing of the cross-section J1, when torque of the cross-section J1 is calculated as 1.85 per-unit value, the tolerant cycle times is 10000, that is, the shafting damage which caused in the #2 shaft bushing is 1/10000.

We take a typical 600 MW set turbine generator of one domestic power plant as an example.

Determine the lumped mass model which is illustrated in FIG. 1. The 4 lumped mass blocks consists of high and intermediate pressure rotor (HIP), the low pressure rotor A (ALP), the low pressure rotor B (BLP), generator (GEN), which are named as shafting vibration system. Note M1, M2, M3 and M4 represent 4 mass blocks. k12, k23 and k34 stands for the massless springs.

Determine the parameters of the lumped mass model, i.e., the equivalent inertias of the mass blocks and the spring constants of the springs as shown in Table 1.

Compute the frequency-vibration curve of the shafting, we can deduce the free motion per unit equation for each mass block as:

$$\begin{cases} M1 * \delta1'' + K12(\delta1 - \delta2) = 0 \\ M2 * \delta2'' + K12(\delta2 - \delta1) + K23(\delta2 - \delta3) = 0 \\ M3 * \delta3'' + K23(\delta3 - \delta2) + K34(\delta3 - \delta4) = 0 \\ M4 * \delta4'' + K34(\delta4 - \delta3) = 0 \end{cases}$$

Which takes matrix form as:

$$\begin{bmatrix} \Delta\delta1'' \\ \Delta\delta2'' \\ \Delta\delta3'' \\ \Delta\delta4'' \end{bmatrix} = \begin{bmatrix} -\frac{K12}{M1} & \frac{K12}{M1} & 0 & 0 \\ \frac{K12}{M2} & -\frac{K12}{M2} - \frac{K23}{M2} & \frac{K23}{M2} & 0 \\ 0 & \frac{K23}{M3} & -\frac{K23}{M3} - \frac{K34}{M3} & \frac{K34}{M3} \\ 0 & 0 & \frac{K34}{M4} & -\frac{K34}{M4} \end{bmatrix} \begin{bmatrix} \Delta\delta1 \\ \Delta\delta2 \\ \Delta\delta3 \\ \Delta\delta4 \end{bmatrix}.$$

Let [K] and [I] represent the coefficient matrix and Identity matrix, respectively. Consequently, the dynamic model of the rotors is $$\begin{bmatrix} \Delta\delta' \\ \Delta\omega' \end{bmatrix} = \begin{bmatrix} 0 & I \\ K & 0 \end{bmatrix} \begin{bmatrix} \Delta\delta \\ \Delta\omega \end{bmatrix}$$

Then we can obtain the frequency-vibration curve of the shafting, as shown in FIGS. 2.1, 2.2, 2.3. Note that these 3 figures represent 3 secondary synchronization frequencies, i.e., 15.5 Hz, 25.98 Hz and 29.93 Hz, which denotes the 3 vibration modes of this shafting.

According to the vibration curve, compute the corresponding various relative torsional angles $\theta_{i,j}$ (i=1,2,3; j=1,2,3). As illustrated in Table 2.

According to the mode frequency, vibration curve, lumped mass model, compute the torques excited by unit signal on cross-section of the shafting $t_{i,j}$ (i=1,2,3; j=1,2,3) as Illustrated in Table 3.

Emulate of one given fault, capture the changes of palstance $\Delta\omega$, then obtain different mode signal $\Delta\omega1$, $\Delta\omega2$, $\Delta\omega3$ by filtering.

With $$\Delta\omega_k = A_k\omega_k \cos(\omega_k t), \Delta\theta_k = \Delta\omega_k t = A_k \sin(\omega_k t) = \Delta\omega_k * \sin(\omega_k t)/[\omega_k * \cos(\omega_k t)],$$

where, $k \in [1,2,3]$, $\omega_k = 2\pi f_k$, the rotation angle in different modes are $\Delta\theta1$, $\Delta\theta2$, $\Delta\omega3$. As shown in the FIG. 3.1-3.3, where y axis's units are MWs, the x axis denotes time record, the length is 8 s, the sampling frequency is 1000 HZ.

According to the torques given in the Table 3, the effect of three modes are added linearly, then is reduced to one cross-section of shafting. In this example, calculate the torque T1 corresponding to cross-section $J_1$ between the first and the second mass block, T1=T1,1+T2,1+T3,1. Where, $T_{1,1}=t_{1,1}\times\Delta\theta_1$, $T_{2,1}=t_{2,1}\times\Delta\theta_2$, $T_{3,1}=t_{3,1}\times\Delta\theta_3$. Further obtain the torque-time history plot, as illustrated in FIGS. 4.1,4.2. The y axis denotes torsional power, the y axis's units are MWs. In FIG. 4.1, the statistic time is 8 s, the sampling frequency is 1000 HZ. FIG. 4.2 is to zoom in the first 2 seconds of FIG. 4.1, the sampling frequency is 1000 HZ.

Find out the stress cycle in the load-time history plot (see FIGS. 4.1 and 4.2) by utilizing real time rain-flow method. Note the number of stress cycle in FIGS. 4.1 and 4.2 is 157, which is given in Table 4. Table 4 also shows the equivalent stress magnitude corresponding to each stress cycle by utilizing linear averaging method.

The cross-section J1 has two dangerous cross-sections which are between the #2 and #3 shaft bushing. In our example, we only consider the damage on the #2 shaft bushing. Look up the (S-N) curve on the #2 shaft bushing which is illustrated in FIG. 5, to obtain the fatigue damage value on the #2 shaft bushing caused by each stress cycle. Sum all the stress cycles linearly to obtain the cumulative fatigue damage values on the #2 shaft bushing of 600 MW turbine-generator with respect to this perturbation. In our example, the cumulative fatigue damage on the 2#shaft bushing is 0.001072%. The fatigue damage on the other dangerous part of the shafting can be calculated in the same way as the #2 shaft bushing.

The architecture of this measurement is illustrated in FIG. 6. Both software and hardware elements are flexible and configurable, which consists of 2 power modules (POW), 2 pulse impulse modules (PI), 1 control module (CM), 1 analog input module (AI), 1 digital input module (DI) and 4 digital output modules (DO). The equipment communicates with HMI (Human-Machine Interface) through a specification named O-NET (applicant-specific communication mode), while DP-NET is utilized for the inside communication. All of the modules can be hot-plugged and linked dynamically.

The PI captures the impulses which will be processed in the CM to compute the mechanical fatigue value. The DO gives alarm or trip based on the value.

Figure 7:
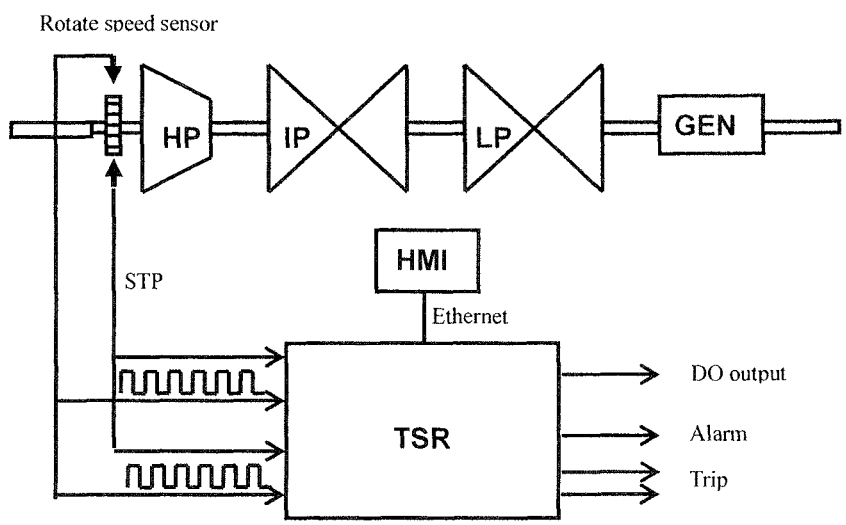
FIG. 7 shows the protection circuits of the shaft torsional mode.

The connecting of torsional vibration protector of turbine generator is illustrated in FIG. 7. A pair of axis sensors is equipped at the input portion. Redundant rotation sensor transmits rotation velocity to obtain the fatigue damage value which can generate DO signal to alarm or trip when the fatigue damage value is beyond the threshold. Furthermore, the data are transmitted by Ethernet and recorded in HMI.

TABLE 1

Shafting modeling data

| Lumped Mass Module | Weight Moment of Inertia (kg*m2) | Spring Constant K (N*m/rad) |
|---|---|---|
| HIP | 2851 | |
| | | 0.76882E+08 |
| ALP | 15542 | |
| | | 0.13316E+09 |
| BLP | 15235 | |
| | | 0.13232E+09 |
| GEN | 9732 | |

TABLE 2

Relative torsional angle in cross-section between mass blocks

| | | Relative Torsional Angle in Cross-section between Mass Blocks | | |
|---|---|---|---|---|
| Mode | Frequency (HZ) | between 1 and 2 | between 2 and 3 | between 3 and 4 |
| Mode1 | 15.5 | θ11 = −0.35176 | θ12 = −0.92079 | θ13 = −0.62897 |
| Mode2 | 26.12 | θ21 = −0.98820 | θ22 = −0.60771 | θ23 = 1.21629.93 |
| Mode3 | 29.93 | θ31 = −1.31161 | θ32 = 0.52913 | θ33 = −0.35334 |

TABLE 3

Torque in cross-section between mass blocks caused by each mode in unit intension

| | | Torque in Cross-section Between Mass Blocks | | |
|---|---|---|---|---|
| Mode | Frequency (HZ) | between 1 and 2 | between 2 and 3 | between 3 and 4 |
| Mode1 | 15.5 | t11 = −1.44211 | t12 = −6.53824 | t13 = −4.43794 |
| Mode2 | 26.12 | t21 = −−2.43477 | t22 = −2.59333 | t23 = 5.15.5767 |
| Mode3 | 29.93 | t31 = −−2.82900 | t32 = 1.97669 | t33 = −1.31166 |

TABLE 4

Stress cycles found in torque-time history plot of cross-section J1 when fault occurs

| Equivalent Stress Amplitude | Peak Point 1 | Peak Point 2 |
|---|---|---|
| MEF = 0.00031373 | E(i) = −0.00097100 | E(i + 1) = −0.00099100 |
| MEF = 0.00129660 | E(i) = 0.00131000 | E(i + 1) = −0.00127000 |
| MEF = 0.00052793 | E(i) = 0.00096500 | E(i + 1) = 0.00128000 |
| MEF = 0.00013544 | E(i) = −0.00008800 | E(i + 1) = −0.00057900 |
| MEF = 0.00057009 | E(i) = 0.00075200 | E(i + 1) = −0.00020900 |
| MEF = 0.00005330 | E(i) = −0.00004000 | E(i + 1) = 0.00006000 |
| MEF = 0.00054518 | E(i) = 0.00057700 | E(i + 1) = −0.00048200 |
| MEF = 0.00009757 | E(i) = 0.00025100 | E(i + 1) = 0.00020700 |
| MEF = 0.00116160 | E(i) = −0.00086700 | E(i + 1) = 0.00131000 |
| MEF = 0.00091055 | E(i) = 0.00214000 | E(i + 1) = 0.00153000 |
| MEF = 0.00107000 | E(i) = 0.00107000 | E(i + 1) = −0.00107000 |

TABLE 4-continued

Stress cycles found in torque-time history plot of cross-section J1 when fault occurs

| Equivalent Stress Amplitude | Peak Point 1 | Peak Point 2 |
|---|---|---|
| MEF = 0.00115088 | E(i) = −0.00083500 | E(i + 1) = 0.00131000 |
| MEF = 0.00005514 | E(i) = −0.00022900 | E(i + 1) = −0.00029000 |
| MEF = 0.00083456 | E(i) = −0.00079000 | E(i + 1) = 0.00085700 |
| MEF = 0.00022375 | E(i) = 0.00000900 | E(i + 1) = 0.00034100 |
| MEF = 0.00009758 | E(i) = −0.00047100 | E(i + 1) = −0.00038400 |
| MEF = 0.00001967 | E(i) = −0.00024700 | E(i + 1) = −0.00015400 |
| MEF = 0.00001915 | E(i) = −0.00018900 | E(i + 1) = −0.00012400 |
| MEF = 0.00014475 | E(i) = −0.00048900 | E(i + 1) = −0.00046400 |
| MEF = 0.00012130 | E(i) = −0.00010800 | E(i + 1) = 0.00012800 |
| MEF = 0.00009276 | E(i) = −0.00034300 | E(i + 1) = −0.00040400 |
| MEF = 0.00016100 | E(i) = −0.00063700 | E(i + 1) = −0.00056300 |
| MEF = 0.02980350 | E(i) = −0.24400000 | E(i + 1) = −0.07810000 |
| MEF = 0.03987000 | E(i) = −0.27800000 | E(i + 1) = −0.20000000 |
| MEF = 0.02236100 | E(i) = −0.01670000 | E(i + 1) = −0.09990000 |
| MEF = 0.07458250 | E(i) = 0.12500000 | E(i + 1) = 0.02550000 |
| MEF = 0.12542500 | E(i) = 0.23700000 | E(i + 1) = 0.30800000 |
| MEF = 0.01732200 | E(i) = −0.07420000 | E(i + 1) = −0.19900000 |
| MEF = 0.01624650 | E(i) = 0.04500000 | E(i + 1) = 0.04710000 |
| MEF = 0.01939500 | E(i) = −0.20800000 | E(i + 1) = −0.35500000 |
| MEF = 0.31217500 | E(i) = −0.24900000 | E(i + 1) = 0.34400000 |

TABLE 4-continued

Stress cycles found in torque-time history plot of cross-section J1 when fault occurs

| Equivalent Stress Amplitude | Peak Point 1 | Peak Point 2 |
|---|---|---|
| MEF = 0.00459750 | E(i) = −0.02170000 | E(i + 1) = −0.05680000 |
| MEF = 0.05211610 | E(i) = 0.00734000 | E(i + 1) = −0.14100000 |
| MEF = 0.11204350 | E(i) = −0.15600000 | E(i + 1) = 0.08990000 |
| MEF = 0.09402500 | E(i) = 0.16200000 | E(i + 1) = 0.22300000 |
| MEF = 0.15282850 | E(i) = 0.26100000 | E(i + 1) = 0.06190000 |
| MEF = 0.03879500 | E(i) = −0.30900000 | E(i + 1) = −0.21400000 |
| MEF = 0.07383650 | E(i) = 0.05310000 | E(i + 1) = −0.11500000 |
| MEF = 0.04101000 | E(i) = −0.17300000 | E(i + 1) = −0.22100000 |
| MEF = 0.04819000 | E(i) = 0.14200000 | E(i + 1) = 0.14400000 |
| MEF = 0.09492150 | E(i) = 0.09730000 | E(i + 1) = −0.09020000 |
| MEF = 0.03615650 | E(i) = 0.09850000 | E(i + 1) = 0.08760000 |

TABLE 4-continued

Stress cycles found in torque-time history plot of cross-section J1 when fault occurs

| Equivalent Stress Amplitude | Peak Point 1 | Peak Point 2 |
|---|---|---|
| MEF = 0.02306250 | E(i) = −0.08500000 | E(i + 1) = −0.07750000 |
| MEF = 0.02483150 | E(i) = 0.07210000 | E(i + 1) = 0.06900000 |
| MEF = 0.06563200 | E(i) = −0.06510000 | E(i + 1) = 0.06590000 |
| MEF = 0.06203600 | E(i) = 0.06150000 | E(i + 1) = −0.06310000 |
| MEF = 0.01818800 | E(i) = 0.05410000 | E(i + 1) = 0.05310000 |
| MEF = 0.01671350 | E(i) = 0.04750000 | E(i + 1) = 0.04440000 |
| MEF = 0.01456350 | E(i) = 0.04200000 | E(i + 1) = 0.03990000 |
| MEF = 0.00526000 | E(i) = −0.03730000 | E(i + 1) = −0.02670000 |
| MEF = 0.00961550 | E(i) = −0.03740000 | E(i + 1) = −0.03330000 |
| MEF = 0.03110050 | E(i) = 0.03100000 | E(i + 1) = −0.03130000 |
| MEF = 0.01195950 | E(i) = 0.03350000 | E(i + 1) = 0.03080000 |
| MEF = 0.00913950 | E(i) = −0.02830000 | E(i + 1) = −0.02800000 |
| MEF = 0.00749600 | E(i) = 0.02070000 | E(i + 1) = 0.02170000 |
| MEF = 0.00610100 | E(i) = −0.02010000 | E(i + 1) = −0.01930000 |
| MEF = 0.01849900 | E(i) = 0.01870000 | E(i + 1) = −0.01810000 |
| MEF = 0.00564950 | E(i) = 0.01580000 | E(i + 1) = 0.01450000 |
| MEF = 0.01309850 | E(i) = −0.01250000 | E(i + 1) = 0.01340000 |
| MEF = 0.00396300 | E(i) = 0.01140000 | E(i + 1) = 0.01080000 |
| MEF = 0.00167460 | E(i) = −0.00580000 | E(i + 1) = −0.00544000 |
| MEF = 0.01106850 | E(i) = 0.01070000 | E(i + 1) = −0.01180000 |
| MEF = 0.00226635 | E(i) = −0.00717000 | E(i + 1) = −0.00702000 |
| MEF = 0.00209935 | E(i) = −0.00747000 | E(i + 1) = −0.00692000 |
| MEF = 0.00207905 | E(i) = 0.00628000 | E(i + 1) = 0.00629000 |
| MEF = 0.00133050 | E(i) = 0.00379000 | E(i + 1) = 0.00391000 |
| MEF = 0.00201120 | E(i) = −0.00948000 | E(i + 1) = −0.00780000 |
| MEF = 0.00102635 | E(i) = −0.00575000 | E(i + 1) = −0.00444000 |
| MEF = 0.00319645 | E(i) = −0.00178000 | E(i + 1) = 0.00391000 |
| MEF = 0.00245620 | E(i) = 0.00590000 | E(i + 1) = 0.00438000 |
| MEF = 0.00067700 | E(i) = 0.00185000 | E(i + 1) = 0.00195000 |
| MEF = 0.00186895 | E(i) = −0.00653000 | E(i + 1) = −0.00610000 |
| MEF = 0.00187005 | E(i) = −0.00609000 | E(i + 1) = −0.00588000 |
| MEF = 0.00272765 | E(i) = 0.00588000 | E(i + 1) = 0.00353000 |
| MEF = 0.00112555 | E(i) = 0.00336000 | E(i + 1) = 0.00331000 |
| MEF = 0.00115840 | E(i) = 0.00349000 | E(i + 1) = 0.00347000 |
| MEF = 0.00192375 | E(i) = 0.00385000 | E(i + 1) = 0.00190000 |
| MEF = 0.00117165 | E(i) = −0.00615000 | E(i + 1) = −0.00486000 |
| MEF = 0.00102631 | E(i) = 0.00056100 | E(i + 1) = −0.00195000 |
| MEF = 0.00126392 | E(i) = −0.00549000 | E(i + 1) = −0.00086500 |
| MEF = 0.00100636 | E(i) = −0.00168000 | E(i + 1) = 0.00066700 |
| MEF = 0.00133795 | E(i) = 0.00347000 | E(i + 1) = 0.00376000 |
| MEF = 0.00031862 | E(i) = 0.00089700 | E(i + 1) = 0.00093100 |
| MEF = 0.00039954 | E(i) = 0.00089400 | E(i + 1) = 0.00058200 |
| MEF = 0.00019390 | E(i) = −0.00142000 | E(i + 1) = −0.00224000 |
| MEF = 0.00010523 | E(i) = 0.00020200 | E(i + 1) = 0.00026000 |
| MEF = 0.00007009 | E(i) = −0.00025300 | E(i + 1) = −0.00029300 |
| MEF = 0.00034950 | E(i) = −0.00118000 | E(i + 1) = −0.00112000 |
| MEF = 0.00019009 | E(i) = −0.00009100 | E(i + 1) = 0.00024000 |
| MEF = 0.00042745 | E(i) = 0.00067200 | E(i + 1) = 0.00005800 |
| MEF = 0.00119155 | E(i) = −0.00087700 | E(i + 1) = 0.00135000 |
| MEF = 0.00039255 | E(i) = −0.00125000 | E(i + 1) = −0.00122000 |
| MEF = 0.00121630 | E(i) = 0.00129000 | E(i + 1) = −0.00107000 |
| MEF = 0.00033462 | E(i) = 0.00020900 | E(i + 1) = −0.00058400 |
| MEF = 0.00031812 | E(i) = 0.00042800 | E(i + 1) = −0.00010000 |
| MEF = 0.00064218 | E(i) = 0.00067200 | E(i + 1) = −0.00058300 |
| MEF = 0.00062445 | E(i) = 0.00073600 | E(i + 1) = −0.00040300 |
| MEF = 0.00081862 | E(i) = 0.00089500 | E(i + 1) = −0.00066700 |
| MEF = 0.00074958 | E(i) = 0.00090100 | E(i + 1) = −0.00044900 |
| MEF = 0.00078607 | E(i) = −0.00068100 | E(i + 1) = 0.00083900 |
| MEF = 0.22609500 | E(i) = 0.20700000 | E(i + 1) = −0.26400000 |
| MEF = 0.17750000 | E(i) = 0.15500000 | E(i + 1) = 0.34500000 |
| MEF = 0.46587500 | E(i) = −0.41600000 | E(i + 1) = 0.49100000 |
| MEF = 0.42965500 | E(i) = −0.42500000 | E(i + 1) = 0.43200000 |
| MEF = 0.01418000 | E(i) = −0.44600000 | E(i + 1) = −0.24600000 |
| MEF = 0.11804500 | E(i) = 0.31000000 | E(i + 1) = 0.26300000 |
| MEF = 0.09014500 | E(i) = 0.19500000 | E(i + 1) = 0.11800000 |
| MEF = 0.02165250 | E(i) = −0.11700000 | E(i + 1) = −0.09150000 |
| MEF = 0.03096200 | E(i) = 0.08550000 | E(i + 1) = 0.07730000 |
| MEF = 0.01866400 | E(i) = −0.07550000 | E(i + 1) = −0.06610000 |
| MEF = 0.01330850 | E(i) = −0.04980000 | E(i + 1) = −0.04510000 |
| MEF = 0.01466400 | E(i) = 0.03530000 | E(i + 1) = 0.02630000 |
| MEF = 0.00689950 | E(i) = 0.01990000 | E(i + 1) = 0.02040000 |
| MEF = 0.01045030 | E(i) = −0.01190000 | E(i + 1) = 0.00972000 |
| MEF = 0.00262780 | E(i) = −0.00889000 | E(i + 1) = −0.00843000 |
| MEF = 0.00372060 | E(i) = 0.00934000 | E(i + 1) = 0.01030000 |
| MEF = 0.00832115 | E(i) = −0.00878000 | E(i + 1) = 0.00809000 |
| MEF = 0.00716760 | E(i) = 0.00698000 | E(i + 1) = −0.00754000 |
| MEF = 0.00262500 | E(i) = 0.00602000 | E(i + 1) = 0.00698000 |
| MEF = 0.00196840 | E(i) = −0.00665000 | E(i + 1) = −0.00631000 |
| MEF = 0.00543455 | E(i) = 0.00519000 | E(i + 1) = −0.00592000 |
| MEF = 0.00235450 | E(i) = 0.00614000 | E(i + 1) = 0.00516000 |
| MEF = 0.00473425 | E(i) = −0.00510000 | E(i + 1) = 0.00455000 |
| MEF = 0.00058190 | E(i) = 0.00132000 | E(i + 1) = 0.00154000 |
| MEF = 0.00057920 | E(i) = −0.00052600 | E(i + 1) = 0.00060600 |
| MEF = 0.00065012 | E(i) = 0.00076100 | E(i + 1) = −0.00043000 |
| MEF = 0.00069785 | E(i) = 0.00149000 | E(i + 1) = 0.00180000 |
| MEF = 0.00078342 | E(i) = 0.00083000 | E(i + 1) = −0.00068300 |
| MEF = 0.00091760 | E(i) = −0.00075600 | E(i + 1) = 0.00099900 |
| MEF = 0.00107245 | E(i) = −0.00072000 | E(i + 1) = 0.00125000 |
| MEF = 0.03672500 | E(i) = −0.22600000 | E(i + 1) = −0.33900000 |
| MEF = 0.02767450 | E(i) = 0.07300000 | E(i + 1) = 0.06230000 |
| MEF = 0.02342850 | E(i) = 0.05790000 | E(i + 1) = 0.04500000 |
| MEF = 0.00093900 | E(i) = −0.02340000 | E(i + 1) = −0.01320000 |
| MEF = 0.01127200 | E(i) = 0.01060000 | E(i + 1) = −0.01260000 |
| MEF = 0.00935235 | E(i) = −0.00896000 | E(i + 1) = 0.00955000 |
| MEF = 0.00663060 | E(i) = 0.00651000 | E(i + 1) = −0.00687000 |
| MEF = 0.00546735 | E(i) = −0.00441000 | E(i + 1) = 0.00600000 |
| MEF = 0.00014832 | E(i) = −0.00132000 | E(i + 1) = −0.00088800 |
| MEF = 0.00062236 | E(i) = −0.00063100 | E(i + 1) = 0.00061800 |
| MEF = 0.00010550 | E(i) = −0.00169000 | E(i + 1) = −0.00101000 |
| MEF = 0.00086960 | E(i) = 0.00088200 | E(i + 1) = −0.00084500 |
| MEF = 0.00135627 | E(i) = −0.00093200 | E(i + 1) = 0.00157000 |
| MEF = 0.20655000 | E(i) = 0.23900000 | E(i + 1) = 0.43100000 |
| MEF = 0.01210400 | E(i) = −0.07940000 | E(i + 1) = −0.05820000 |
| MEF = 0.01247350 | E(i) = 0.02450000 | E(i + 1) = 0.01140000 |
| MEF = 0.00713340 | E(i) = 0.00712000 | E(i + 1) = −0.00716000 |
| MEF = 0.00043930 | E(i) = 0.00117000 | E(i + 1) = 0.00125000 |
| MEF = 0.11366500 | E(i) = −0.41900000 | E(i + 1) = −0.38200000 |
| MEF = 0.00024778 | E(i) = −0.00082800 | E(i + 1) = −0.00090400 |
| MEF = 0.00082835 | E(i) = 0.00076300 | E(i + 1) = 0.00163000 |
| MEF = 0.00013099 | E(i) = −0.00039100 | E(i + 1) = 0.00000000 |
| MEF = 0.00675285 | E(i) = 0.00752000 | E(i + 1) = −0.00523000 |
| MEF = 0.00024700 | E(i) = −0.00920000 | E(i + 1) = −0.01900000 |
| MEF = 0.12675000 | E(i) = −0.02700000 | E(i + 1) = 0.17700000 |
| MEF = 0.18119500 | E(i) = 0.27300000 | E(i + 1) = 0.41000000 |
| MEF = 0.48251000 | E(i) = 0.64800000 | E(i + 1) = −0.15400000 |

TABLE 5

Fatigue damage in each danger section caused by certain disturbance

| Dangerous Cross-sections | Fatigue Damage (%) |
|---|---|
| Position of 2# shaft bushing | 0.03548 |
| Position of 3# shaft bushing | 0.0 |
| Position of 4# shaft bushing | 0.00611 |
| Position of 5# shaft bushing | 0.00692 |
| Position of 6# shaft bushing | 0.05248 |

The invention claimed is:

1. A computer implemented measuring method of mechanical fatigue in turbo-unit shafting, comprising the steps of:
   1) determine a lumped mass model and model parameters of a turbo-unit;
   2) compute, using a computer, torsional mode frequency and vibration curve based on the mass model;
   3) record real-time changes of terminal palstance Δω, then record changes of palstance Δω1, Δω2, Δω3 ..., Δωn in different modes by filtering, and then compute, using the computer, terminal rotation angle of each mode $\Delta\theta_k$ by $$\Delta\theta_k = \Delta\omega_k * \sin(\omega_k t)/[\omega_k * \cos(\omega_k t)]$$

where $$\Delta\omega_k = A_k\omega_k \cos(\omega_k t), \Delta\theta_k = \Delta\omega_k t = A_k \sin(\omega_k t)$$

(k=1, 2, 3, ... n)
$\omega_k = 2\pi f_k$,
$A_K$: palstance changing amplitude of each mode;
$f_k$: mode frequency;

4) using the mode frequencies, vibration curve and equivalent spring constants of the lumped mass model of the turbo-unit, calculate, using the computer, a torque on each cross-section of the shafting in each mode by multiplying $\Delta\theta_k$ and torque between mass blocks in each mode when excited by unit signal on each cross-section of the shafting, then calculate a torque on each cross-section of the shafting by accumulating torques on said cross-section in each mode respectively, and thus obtain a torque-time history plot;

5) find out stress cycle in the history plot for the torque on each cross-section of the shafting, and compute, using the computer, equivalent stress magnitude corresponding to each stress cycle;

6) look up Stress-Fatigue Life curve for dangerous cross-sections so as to obtain fatigue damage value caused by a single stress cycle; and 7) compute, using the computer, a cumulative fatigue value of all cross-sections of the shafting caused by a specific vibration, namely the mechanical fatigue of the turbo-unit shafting.

2. The measuring method according to claim 1, wherein the cross-section and a dangerous cross-section depend on a number of rotors and shafting size, use of a joint position of each mass block as cross-section, and a journal position of each rotor in the shafting as a dangerous cross-section.

3. The measuring method according to claim 1, comprising the steps of capturing palstance variations, filtering, obtaining three modes f1, f2, f3, and generating corresponding torques in cross-sections $J_1$, $J_2$, $J_3$, $$-T_{1,1}, T_{1,2}, T_{1,3}$$

$$T_{2,1}, T_{2,2}, T_{2,3}$$

$$-T_{3,1}, T_{3,2}, T_{3,3}$$

where
the torques in three modes corresponding to cross-section $J_1$ are: $T_{1,1}$, $T_{2,1}$, $T_{3,1}$;
the torques in three modes corresponding to cross-section $J_2$ are: $T_{1,2}$, $T_{2,2}$, $T_{3,2}$;
the torques in three modes corresponding to cross-section $J_3$ are: $T_{1,3}$, $T_{2,3}$, $T_{3,3}$.

4. The measuring method according to claim 3, characterized in that: the torques (T1,T2,T3) on each cross-section of the shafting are obtained by linearly adding each torque on a same cross-section above:

$$-T_1 = T_{1,1} + T_{2,1} + T_{3,1}$$

$$T_2 = T_{1,2} + T_{2,2} + T_{3,2}$$

$$T_3 = T_{1,3} + T_{2,3} + T_{3,3}$$

thereby allowing a torque-time history plot in each cross-section of shafting to be obtained.

5. The measuring method according to claim 1, further comprising the steps of finding out stress cycle in the history plot is achieved by utilizing real time rain-flow method, and computing equivalent stress magnitude is achieved by utilizing averaging method.

* * * * *